(12) United States Patent
Dasgupta et al.

(10) Patent No.: US 11,493,373 B2
(45) Date of Patent: Nov. 8, 2022

(54) CLAMP ON ELECTROMAGNETIC FLOWMETER FOR DETERMINING FLOW IN A PIPE USING LEAKAGE CURRENT COMPENSATION

(71) Applicant: ABB Schweiz AG, Baden (CH)

(72) Inventors: Subhashish Dasgupta, Bangalore (IN); Vinay Kariwala, Bangalore (IN)

(73) Assignee: ABB Schweiz AG, Baden (CH)

( * ) Notice: Subject to any disclaimer, the term of this patent is extended or adjusted under 35 U.S.C. 154(b) by 202 days.

(21) Appl. No.: 16/957,868

(22) PCT Filed: Dec. 19, 2018

(86) PCT No.: PCT/IB2018/060324
§ 371 (c)(1),
(2) Date: Jun. 25, 2020

(87) PCT Pub. No.: WO2019/130163
PCT Pub. Date: Jul. 4, 2019

(65) Prior Publication Data
US 2021/0055144 A1 Feb. 25, 2021

(30) Foreign Application Priority Data
Dec. 29, 2017 (IN) .............................. 201741047287

(51) Int. Cl.
*G01F 1/58* (2006.01)
*G01F 1/60* (2006.01)
(Continued)

(52) U.S. Cl.
CPC ................ *G01F 1/60* (2013.01); *G01F 1/584* (2013.01); *G01F 15/14* (2013.01); *G01F 15/18* (2013.01)

(58) Field of Classification Search
None
See application file for complete search history.

(56) References Cited

U.S. PATENT DOCUMENTS 4,679,442 A * 7/1987 Kubota ................... G01F 15/14
73/861.12
4,825,703 A * 5/1989 Kubota ..................... G01F 1/58
73/861.12
(Continued)

FOREIGN PATENT DOCUMENTS

JP         S5946510 A     3/1984
JP         2007263845 A   10/2007

OTHER PUBLICATIONS

EPO, International Search Report for PCT/IB2018/060324, dated Apr. 23, 2019, 2 pages.
(Continued)

*Primary Examiner* — Harshad R Patel
(74) *Attorney, Agent, or Firm* — Leydig, Voit & Mayer, Ltd.

(57) ABSTRACT

The present invention provides for a method for operating an electromagnetic flowmeter capable of being mounted on to a surface of a flow pipe for measuring a flow of fluid flowing in the flow pipe. The method comprising: exciting the coil to have electromagnetic interaction with the fluid in the flow pipe resulting in leakage current; providing a current to compensate for the resulting leakage current in the flow pipe by applying a potential difference to electrodes that are attached to a housing of the electromagnetic flowmeter and in contact with the flow pipe; detecting a condition wherein the resulting current flowing is within a threshold range; and determining a measure of flow in the flow pipe based on a value of the applied potential difference.

11 Claims, 5 Drawing Sheets

(51) Int. Cl.
*G01F 15/14* (2006.01)
*G01F 15/18* (2006.01)

(56) References Cited

U.S. PATENT DOCUMENTS

| | | | | |
|---|---|---|---|---|
| 5,125,276 A | * | 6/1992 | Wada | G01F 1/588 |
| | | | | 73/861.15 |
| 5,385,055 A | * | 1/1995 | Kubota | G01F 1/588 |
| | | | | 73/861.12 |
| 5,583,299 A | * | 12/1996 | Murase | A61B 5/0265 |
| | | | | 73/861.12 |
| 2009/0260453 A1 | | 10/2009 | Hiroshi et al. | |
| 2010/0024568 A1 | * | 2/2010 | Diederichs | G01F 1/584 |
| | | | | 73/861.12 |
| 2010/0288054 A1 | * | 11/2010 | Foss | G01F 1/60 |
| | | | | 73/861.12 |
| 2014/0090483 A1 | * | 4/2014 | Smith | G01F 1/586 |
| | | | | 73/861.11 |
| 2014/0251025 A1 | * | 9/2014 | Rogers | G01F 1/584 |
| | | | | 73/861.12 |
| 2015/0082909 A1 | | 3/2015 | Ronald et al. | |

OTHER PUBLICATIONS

EPO, Written Opinion of ISA for PCT/IB2018/060324, dated Apr. 23, 2019, 6 pages.

\* cited by examiner

CLAMP ON ELECTROMAGNETIC FLOWMETER FOR DETERMINING FLOW IN A PIPE USING LEAKAGE CURRENT COMPENSATION

FIELD OF THE INVENTION

The present invention relates to the field of electromagnetic flowmeters and more particularly to a method of operating a clamp on electromagnetic flowmeters.

BACKGROUND OF THE INVENTION

Measurement of flow of fluids through a conduit or pipe can be done by numerous ways including using electromagnetic flowmeters. A typical electromagnetic flowmeter works on Faraday's law of electromagnetic induction. An electromagnetic field is imposed within a flow pipe having a flow of fluid with a certain level of conductivity. Electromotive force (EMF) induced as a result of the interaction of the electromagnetic field with fluid molecules (ions in the fluid), is measured using electrodes provided at the flow meter pipe side walls. The measured EMF is proportional to the flowrate and thus used to measure flowrate.

EM flowmeters are widely used to measure fluid flowrate and conventionally they are installed in the fluid path along with the main pipe carrying the fluid and where the flow of the fluid is required to be measured. Such arrangement for installation requires bolting the EM flowmeter flanges with flanges provided in the main pipe. The EM flowmeters are installed between the main pipes through which the flow of fluid is to be measured. Such pre-installations of EM flowmeters between a sections of the main pipe involve planning the installation of the flowmeter together with installation of the main pipe or later on by cutting the main pipe which increases complexity, invasiveness and resulting in inconvenience.

There is a need for an electromagnetic flowmeter that can be easily installed in the interest of improving convenience, especially in scenarios wherein the EM flowmeters are to be installed at a later point in time in the main pipes.

SUMMARY

The above-mentioned shortcomings, disadvantages and problems are addressed herein which will be understood by reading and understanding the following specification.

The present invention provides for a method for operating an electromagnetic flowmeter capable of being mounted on to a surface of a flow pipe for measuring a flow of fluid flowing in the flow pipe, the method comprising: exciting the coil to have electromagnetic interaction with the fluid in the flow pipe resulting in leakage current in flow pipe due to electromagnetic interaction in the flow pipe; providing a current to compensate for the resulting leakage current in the flow pipe by applying a potential difference to a pair of electrodes that are attached to a housing of the electromagnetic flowmeter and in contact with the flow pipe; detecting a condition with a processing unit wherein the resulting current flowing in the pipe is within a threshold range; and determining a measure of flow in the flow pipe with the processing unit based on a value of the applied potential difference.

In an embodiment of the present invention, the value of the resulting current flowing in the pipe within a threshold range is zero.

In an aspect, the present invention provides an electromagnetic flowmeter capable of being mounted on to a surface of a flow pipe for measuring a flow of fluid flowing in the flow pipe, the electromagnetic flowmeter comprising: a housing with a bracket fastened on to the flow pipe wherein an inner surface of the bracket is attached with a coil wherein the coil is electrically excited to generate an electromagnetic filed for interaction with the fluid flowing through the flow pipe and resulting in a circulating leakage current in the flow pipe; a control circuitry with: a controllable voltage source for supplying a potential difference onto a pair of electrodes, wherein the pair of electrodes are attached to the housing and are in contact with the flow pipe to provide a compensating current to the circulating leakage current in the flow pipe; a current sensing means to measure current flowing in the flow pipe; and a processing unit to detect a condition where the measured current is within a threshold range and to measure of flow in the flow pipe proportional to the applied potential difference with the controllable voltage source.

In an embodiment, the controllable voltage source is at least one of a DC source or an AC source.

In an embodiment, the electromagnetic flowmeter comprises a display for indicating the determined flow of fluid in the flow pipe.

In an embodiment the current sensing means is an ammeter.

In an embodiment the electromagnetic flowmeter transmits the determined flow of fluid in the flow pipe to a remote control center of the electromagnetic flowmeter for storage and analysis.

BRIEF DESCRIPTION OF DRAWINGS

The appended drawings illustrate exemplary embodiments as disclosed herein, and are not to be considered limiting in scope. In the drawings.

DETAILED DESCRIPTION

In the following detailed description, reference is made to the accompanying drawings that form a part hereof, and in which is shown by way of illustration specific embodiments, which may be practiced. These embodiments are described in sufficient detail to enable those skilled in the art to practice the embodiments, and it is to be understood that other embodiments may be utilized. The following detailed description is, therefore, not to be taken in a limiting sense.

Figure 1A:
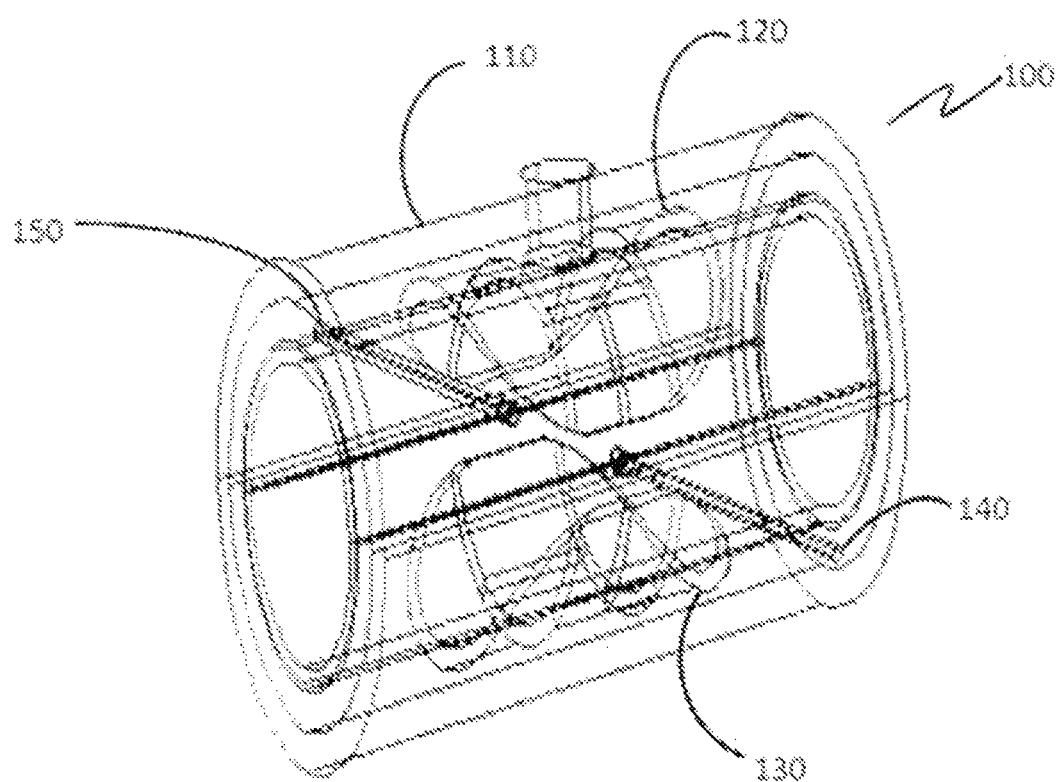
FIG. 1a shows a prior-art electromagnetic flowmeter.
Figure 1B:
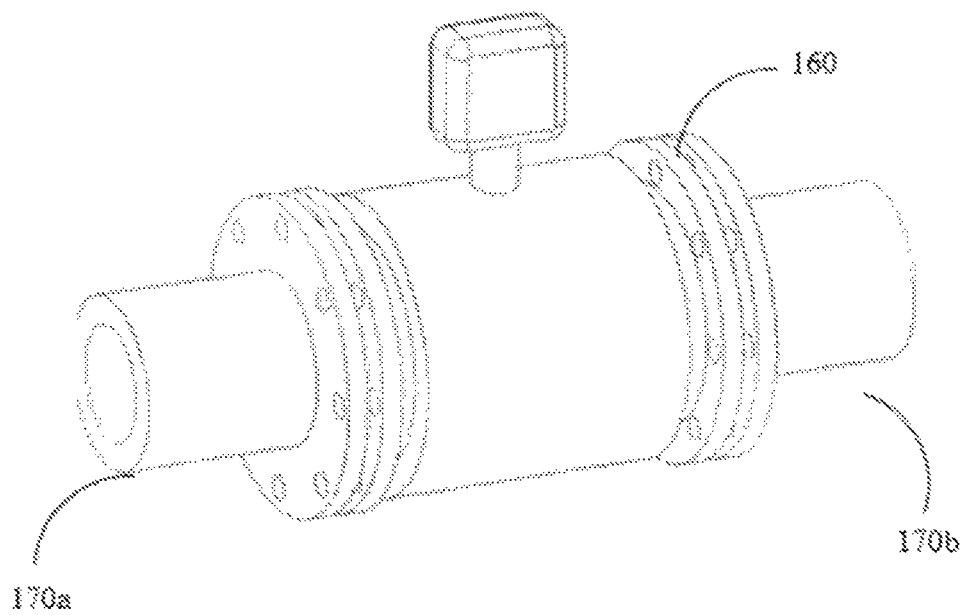
FIG. 1b shows an overview of a prior-art electromagnetic flowmeter.

FIG. 1a shows an electromagnetic flowmeter 100. FIG. 1a shows an electromagnetic flow meter, which comprises a conduit/pipe 110 through which fluid flows, a pair of coils (a top coil 120 and a bottom coil 130) for generating electromagnetic fields that interact with the fluid passing through the conduit, wherein the pair of coils are placed opposite to each other on the conduit along a first axis perpendicular to the flow of the fluid passing through the conduit and a pair of potential sensing electrodes (140 and 150) for measuring electromotive forces by means of measuring potential difference between the electrodes generated by the interaction of electromagnetic fields in the fluid, the pair of potential sensing electrodes are placed opposite to each other on the conduit along a second axis that is perpendicular to the first axis and to the flow of the fluid. The pair of coils (120 and 130) are placed horizontally parallel to the direction of fluid flow along the conduit 110. Also there is an insulating layer or liner to prevent loss of signal in a metallic pipe. The pair of coils 120 and 130 are provided, one each, at the top and bottom of the liner. The pair of potential sensing electrodes (140 and 150) which are inserted at the sides of the liner are placed across the diameter provide the induced EMF as a result of the difference in potential across the conduit diameter. FIG. 1b shows an overview of a prior-art electromagnetic flowmeter. The entire system is enclosed in a magnetic cover which contains the magnetic field and ensures strong signal. As shown in FIG. 1b, flanges 160 are shown which are used for fixing the electromagnetic flowmeter to both the sides of the main pipe 170a and 170b. For installing the electromagnetic flowmeter in the main pipe, the main pipe is required to be cut in order to fit the electromagnetic flowmeter between the two sides of the main pipe 170a and 170b and fitted with flanges on the main pipe as well as the electromagnetic flowmeter indicated by 160.

The present invention relates to a method of operating an electromagnetic flowmeter. In this invention, an electromagnetic flowmeter is disclosed that can be clamped on to a main pipe or flow pipe through which fluid is flowing. Usually, electromagnetic flowmeters are pre-installed in the main pipe or installed by cutting a section of the main pipe and installing the electromagnetic flowmeter in the cut section. A clamp on electromagnetic flowmeter comprises a clamp on mechanism to clamp the electromagnetic flowmeter on to the sides of the main pipe and avoids any cutting of the main pipe. Similar to prior-art electromagnetic flowmeters, the clamp on electromagnetic flowmeter comprise coils that are electrically excited to generate a magnetic field that interacts with the fluid passing through the main pipe and the coils are clamped on the sides of the main pipe.

Figures 2A, 2B:
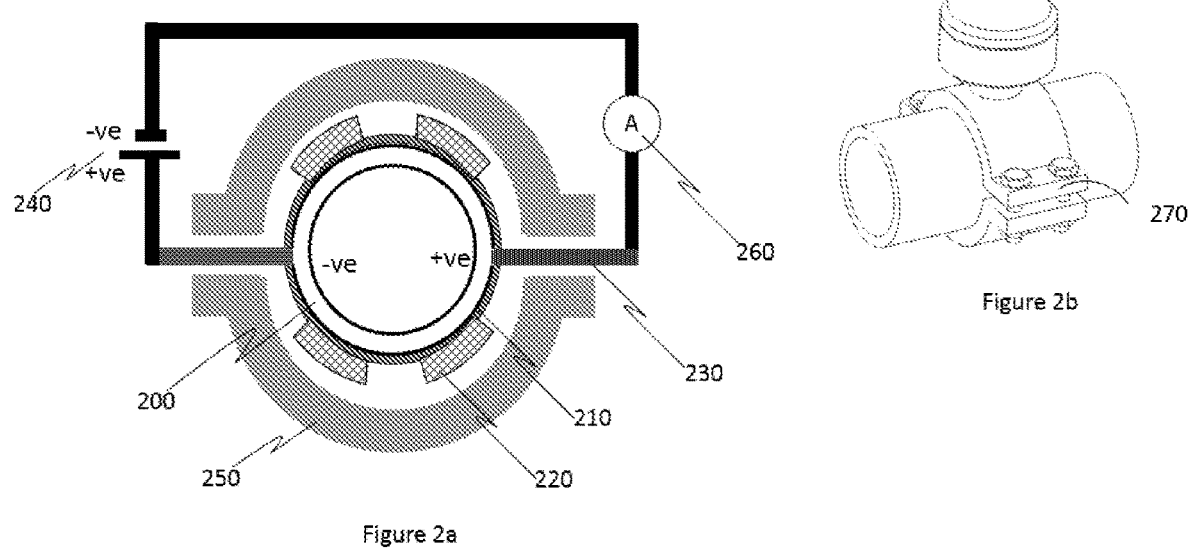
FIG. 2a shows a cross sectional view of a clamp on electromagnetic flowmeter.
FIG. 2b shows an overview of a clamp on electromagnetic flowmeter.

FIG. 2a shows a cross sectional view of a clamp on electromagnetic flowmeter. The clamp on electromagnetic flowmeter is capable of being mounted onto a surface of the metal pipe through which the fluid whose flow rate is to be measured is flowing. FIG. 2a shows the cross sectional view of the main or metal pipe 200 encompassed by a liner 210 for supporting the pair of coils indicated by 220. A pair of electrodes 230 are shown which are in contact with the metal pipe 200. The pair of electrodes are connected to a voltage source 240 wherein the voltage source can be a battery or any other DC voltage source or an AC voltage source. The clamp on flowmeter as shown in FIG. 2a comprises a housing with a bracket 250 fastened on to the flow pipe for example with flanges or clamps as also shown in FIG. 2b indicated as 270. The inner surface of the housing 250 is attached with the set of coils 220 on top and bottom sides (any one side is also sufficient for operation). Also the clamp on electromagnetic flowmeter is provided with a control circuitry. The control circuitry is pivotal in controlling the voltage supply 240 based on a generated leakage current in a section where the clamp on electromagnetic flowmeter is mounted.

The control circuitry manages a controllable voltage source (shown in FIG. 2a as 240) for supplying a potential difference onto the pair of electrodes 230 in order to provide a compensating current for nullifying the circulating current (resulting from loss/leakage from interaction of fluid with the electromagnetic field) produced in the flow pipe as a result of electrical excitation of the coils and interaction of electromagnetic field generated by the coils with the fluid in the pipe. The pair of electrodes 230 are attached to the housing and are in contact with the flow pipe. Also, a current sensing means 260 is provided in the clamp on electromagnetic flowmeter to measure the current flowing in cross-section of the flow pipe as a result of the leakage current and the compensating current provided by the voltage source. As known to the person skilled in the art, the current sensing means can be an ammeter.

A processing unit (not shown) is provided to detect a condition where the measured current is within a threshold range for null condition (compensating current is equal to the leakage current) and to drive the control circuitry to vary the voltage from the voltage source to achieve the null condition. Therefore, the measured current is driven to achieve a near zero level or indicate a no current reading. The condition under which a zero current is detected on application of the potential difference is the condition when there is no leakage current flowing in the metal pipe and hence the voltage applied to create the compensating current for the leakage current is the required voltage for determination of the flow rate of the fluid. Thus, the processing unit gives the flow rate in the flow pipe measured as proportional to the applied potential difference.

FIG. 2b shows an overview of the clamp on electromagnetic flowmeter disclosed by the present invention. The clamp on electromagnetic flowmeter shown in FIG. 2b has a structure wherein the electromagnetic flowmeter is attached or bolted over the main pipe or end-pipe with flanges 270. The main pipe which is usually metallic is in direct electrical contact with the liquid due to absence of an insulating liner.

Figure 3A:
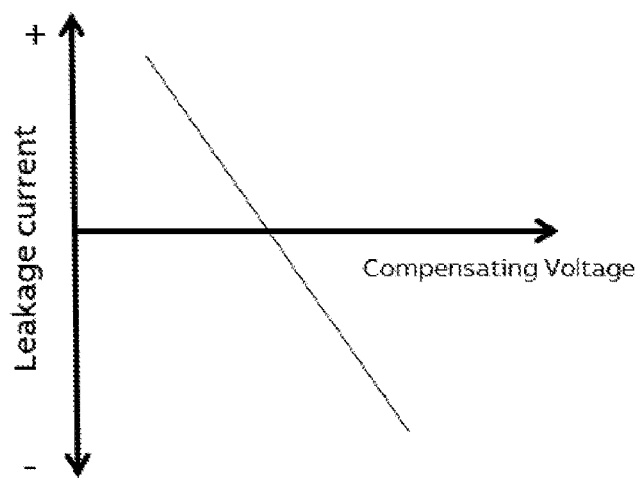
FIG. 3a shows a graph of leakage current versus compensating voltage.
Figure 3B:
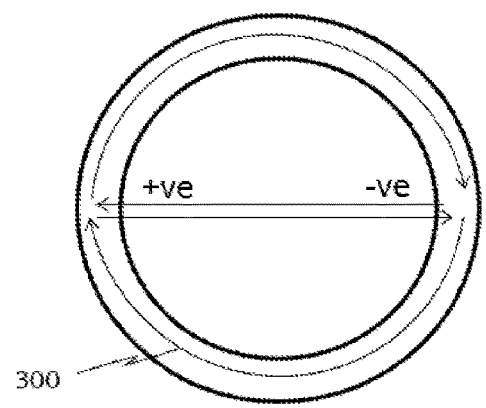
FIG. 3b shows loss of signal due to leakage current in the cross section of the metal pipe.
Figure 4:
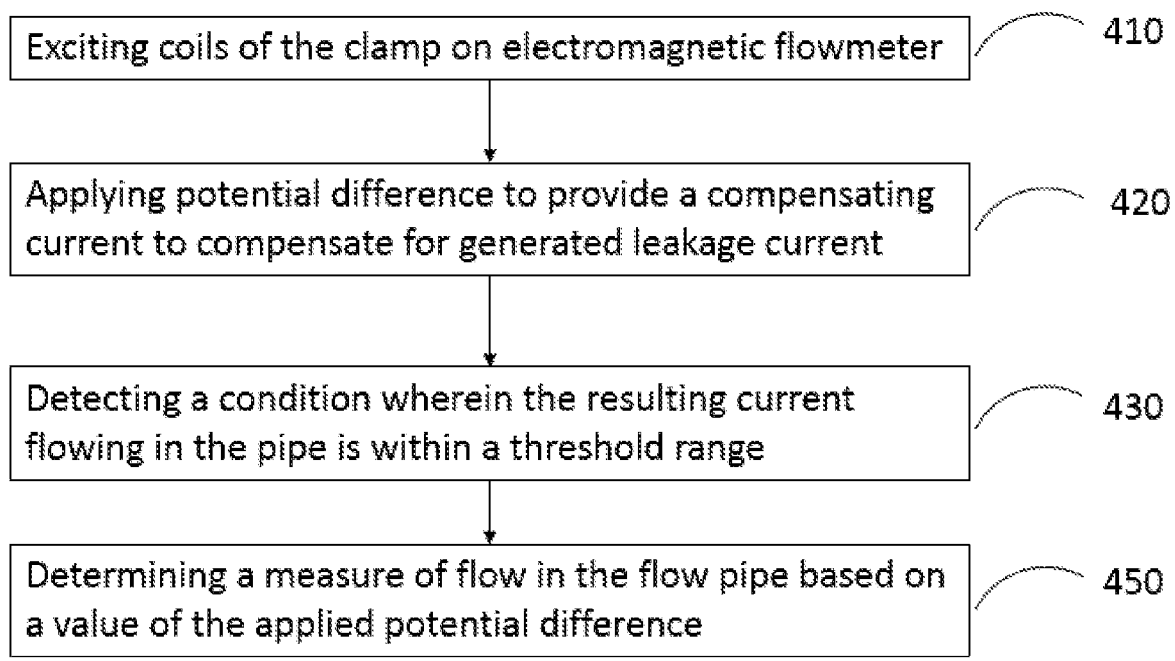
FIG. 4 shows a flow diagram of the method of operating the clamp on electromagnetic flowmeter.

FIG. 3a shows a relationship between the compensating voltage and leakage current. For a given flowrate a signal (compensating current from the voltage source) equal and opposite to the generated signal (leakage current) is imposed on the pipe walls by the electrodes. The resulting current flowing through the pipe walls is zero. Since, the voltage signal from the voltage source to be externally imposed is not known, the control circuitry along with the processing unit is used for scanning for a condition where the resultant current measured is zero. The corresponding voltage is recorded and using the pre-established calibration factor (through calibration process using a reference flow meter), flowrate is determined. FIG. 3b shows loss of signal due to leakage current in the cross section of the metal pipe. In the clamp on electromagnetic flowmeter due to absence of insulating liner inside the metallic flow pipe, energy from interaction of electromagnetic field with the fluid is lost in the form of currents circulating through the conducting pipe as indicated by 300. FIG. 4 shows the method for operating the clamp on electromagnetic flowmeter. As mentioned, the clamp on electromagnetic flowmeter is capable of being mounted on the main pipe or flow pipe through which the fluid is flowing. As shown in FIG. 4, as a first step the pair of coils are excited to provide for the electromagnetic interaction with the fluid in the flow pipe resulting in leakage current in flow pipe. As shown in step 420, a current is provided externally to compensate for the resulting leakage current in the flow pipe. This current is provided by applying a potential difference to the pair of electrodes that are attached to the housing of the electromagnetic flowmeter and are also in contact with the flow pipe. As shown in step 430, a condition is detected with the processing unit where the resulting current flowing in the main pipe is within a threshold range.

Finally, as shown in step 450 the measure of flow is determined with the processing unit based on the value of the applied potential difference.

In an embodiment, the clamp on flowmeter can comprise a display for indicating the determined flow of fluid in the flow pipe.

In an embodiment, the clamp on electromagnetic flowmeter transmits the determined flow of fluid in the flow pipe to a remote control center of the electromagnetic flowmeter for storage or further analysis.

In an embodiment, the clamp on electromagnetic flowmeter is Internet of Things (IOT) enabled for providing remote controlling, better visibility of the working of the clamp on electromagnetic flowmeter, providing real time information to software systems and other surrounding IOT enabled systems.

This written description uses examples to describe the subject matter herein, including the best mode, and also to enable any person skilled in the art to make and use the subject matter. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A method for operating an electromagnetic flowmeter capable of being mounted on to a surface of a flow pipe for measuring a flow of fluid flowing in the flow pipe, the method comprising:
    exciting a coil to have electromagnetic interaction with the fluid in the flow pipe resulting in leakage current in the flow pipe due to electromagnetic interaction in the flow pipe;
    providing a current to compensate for the resulting leakage current in the flow pipe by applying a potential difference to a pair of electrodes that are attached to a housing of the electromagnetic flowmeter and in contact with the flow pipe;
    detecting a condition with a processing unit wherein the resulting current flowing in the flow pipe is within a threshold range; and
    determining a measure of flow in the flow pipe with the processing unit based on a value of the applied potential difference.

2. The method as claimed in claim 1, wherein value of the resulting current flowing in the pipe within a threshold range is zero.

3. The method as claimed in claim 1, wherein exciting the coil comprises exciting a single coil.

4. The method as claims in claim 1, wherein an insulating liner encompasses the flow pipe and supports the coil against the flow pipe.

5. An electromagnetic flowmeter capable of being mounted on to a surface of a flow pipe for measuring a flow of fluid flowing in the flow pipe, the electromagnetic flowmeter comprising:
    a housing with a bracket fastened on to the flow pipe wherein an inner surface of the bracket is attached with a coil wherein the coil is electrically excited to generate an electromagnetic field for interaction with the fluid flowing through the flow pipe and resulting in a circulating leakage current in the flow pipe;
    a control circuitry with:
        a controllable voltage source for supplying a potential difference onto a pair of electrodes, wherein the pair of electrodes are attached to the housing and are in contact with the flow pipe to provide a compensating current to the circulating leakage current in the flow pipe;
        a current sensing means to measure current flowing in the flow pipe; and
        a processing unit to detect a condition where the measured current is within a threshold range and to measure of flow in the flow pipe proportional to the applied potential difference with the controllable voltage source.

6. The electromagnetic flowmeter as claimed in claim 5, wherein the controllable voltage source is at least one of a DC source or an AC source.

7. The electromagnetic flowmeter as claimed in claim 5, comprises a display for indicating the determined flow of fluid in the flow pipe.

8. The electromagnetic flowmeter as claimed in claim 5, wherein the current sensing means is an ammeter.

9. The electromagnetic flowmeter as claimed in claim 5, transmits the determined flow of fluid in the flow pipe to a remote control center of the electromagnetic flowmeter for storage and analysis.

10. The electromagnetic flowmeter as claimed in claim 5, wherein the coil is a single coil.

11. The electromagnetic flowmeter as claimed in claim 5, wherein an insulating liner encompasses the flow pipe and supports the coil against the flow pipe.

* * * * *